(12) United States Patent
Peng

(10) Patent No.: US 8,724,529 B2
(45) Date of Patent: *May 13, 2014

(54) METHOD AND SYSTEM FOR TRANSMITTING NON-3GPP2 MESSAGE IN HRPD SYSTEM

(75) Inventor: Zhiwei Peng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 226 days.

This patent is subject to a terminal disclaimer.

(21) Appl. No.: 13/257,980

(22) PCT Filed: Dec. 23, 2009

(86) PCT No.: PCT/CN2009/075917
§ 371 (c)(1),
(2), (4) Date: Sep. 21, 2011

(87) PCT Pub. No.: WO2010/111873
PCT Pub. Date: Oct. 7, 2010

(65) Prior Publication Data
US 2012/0008566 A1    Jan. 12, 2012

(30) Foreign Application Priority Data
Apr. 1, 2009   (CN) .......................... 2009 1 0081060

(51) Int. Cl.
*H04B 7/00* (2006.01)
*H04W 36/14* (2009.01)
*H04W 88/06* (2009.01)

(52) U.S. Cl.
CPC .............. *H04W 36/14* (2013.01); *H04W 88/06* (2013.01)
USPC .......................... 370/310; 370/328; 370/329

(58) Field of Classification Search
CPC ..... H04W 36/14; H04W 88/06; H04W 84/18; H04W 84/12
USPC .................................................. 370/328, 329
See application file for complete search history.

(56) References Cited

U.S. PATENT DOCUMENTS 5,555,244 A    9/1996  Gupta et al.
7,209,741 B2 *  4/2007  Julka et al. ................. 455/435.1
(Continued)

FOREIGN PATENT DOCUMENTS

CN    1681332 A    10/2005
CN    1901686 A    1/2007
(Continued)

OTHER PUBLICATIONS

International Search Report in international application No. PCT/CN2009/075917, mailed on Apr. 1, 2010.

(Continued)

*Primary Examiner* — Chuong T Ho
(74) *Attorney, Agent, or Firm* — Oppedahl Patent Law Firm LLC

(57) ABSTRACT

The present invention discloses a method for transmitting a non-Third Generation Partnership Project 2 (3GPP2) message in a High Rate Packet Data (HRPD) system, comprising: a transmitting end encapsulates the non-3GPP2 message in a non-3GPP2 Info Transfer message according to a preset format of the non-3GPP2 Info Transfer message and transmits the non-3GPP2 Info Transfer message to a receiving end through an HRPD air interface (301); and the receiving end decapsulates the non-3GPP2 Info Transfer message obtained from the HRPD air interface, according to the preset format of the non-3GPP2 Info Transfer message, to obtain the non-3GPP2 message (302). The present invention further discloses a system for transmitting the non-3GPP2 message in the HRPD system. The present invention realizes the transmission of the non-3GPP2 message in the HRPD system.

16 Claims, 4 Drawing Sheets

(56) References Cited

U.S. PATENT DOCUMENTS

| | | | |
|---|---|---|---|
| 7,734,987 B2 | 6/2010 | Kaburaki et al. | |
| 2006/0039310 A1* | 2/2006 | Julka et al. | 370/315 |
| 2006/0251058 A1 | 11/2006 | Xu et al. | |
| 2007/0178906 A1 | 8/2007 | Gao et al. | |
| 2008/0089293 A1 | 4/2008 | Madour et al. | |
| 2008/0161036 A1 | 7/2008 | Tu et al. | |
| 2008/0310323 A1* | 12/2008 | Shirota et al. | 370/254 |
| 2009/0073933 A1* | 3/2009 | Madour et al. | 370/331 |
| 2009/0199268 A1* | 8/2009 | Ahmavaara et al. | 726/1 |
| 2012/0020262 A1* | 1/2012 | Peng et al. | 370/310 |

FOREIGN PATENT DOCUMENTS

| | | |
|---|---|---|
| CN | 101171850 A | 4/2008 |
| CN | 101291535 A | 10/2008 |
| CN | 101355801 A | 1/2009 |
| JP | 6282502 A | 10/1994 |
| JP | 2000032527 A | 1/2000 |
| JP | 2002232930 A | 8/2002 |
| JP | 2007151171 A | 6/2007 |
| JP | 2007243979 A | 9/2007 |
| JP | 2010521924 A | 6/2010 |
| KR | 20050103099 A | 10/2005 |
| KR | 20070023260 A | 2/2007 |
| KR | 1020070061163 A | 6/2007 |
| WO | 2008044215 A2 | 4/2008 |
| WO | 2008115757 A1 | 9/2008 |
| WO | 2008129436 A2 | 10/2008 |
| WO | 2008157633 A2 | 12/2008 |

OTHER PUBLICATIONS

English Translation of the Written Opinion of the International Search Authority in international application No. PCT/CN2009/075917, mailed on Apr. 1, 2010.

Mobile WiMAX Radio Technologies Mar. 2008.

Proposed updates to Stage 2 for CDMA2000 handover May 9, 2008.

* cited by examiner

Prior Art

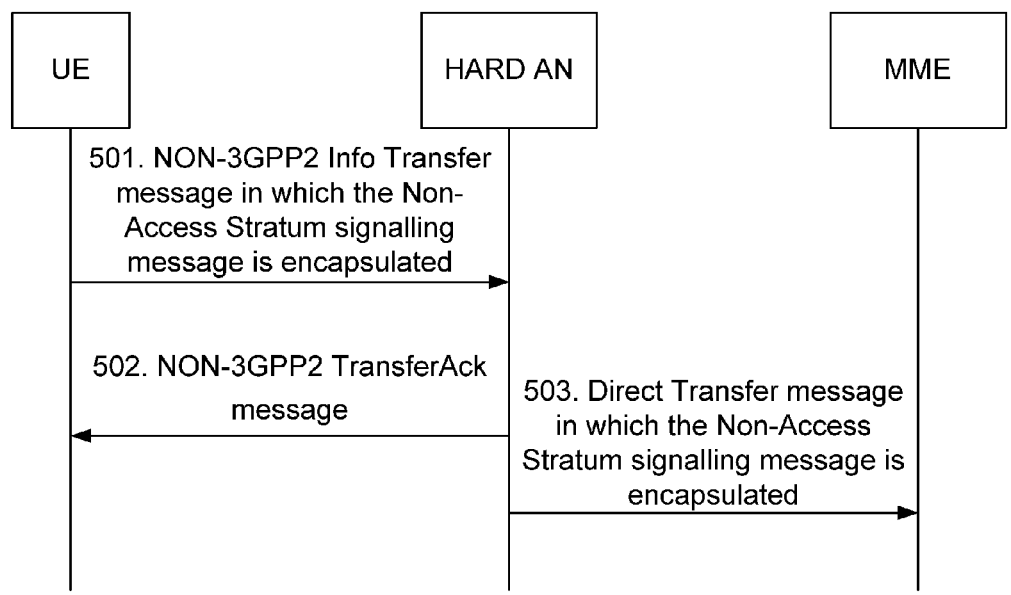
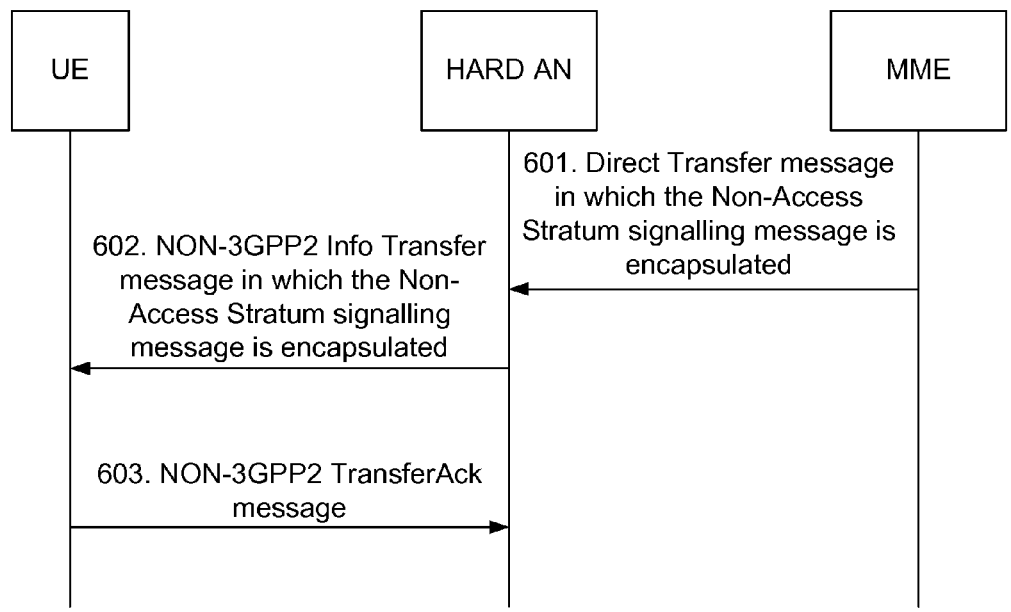

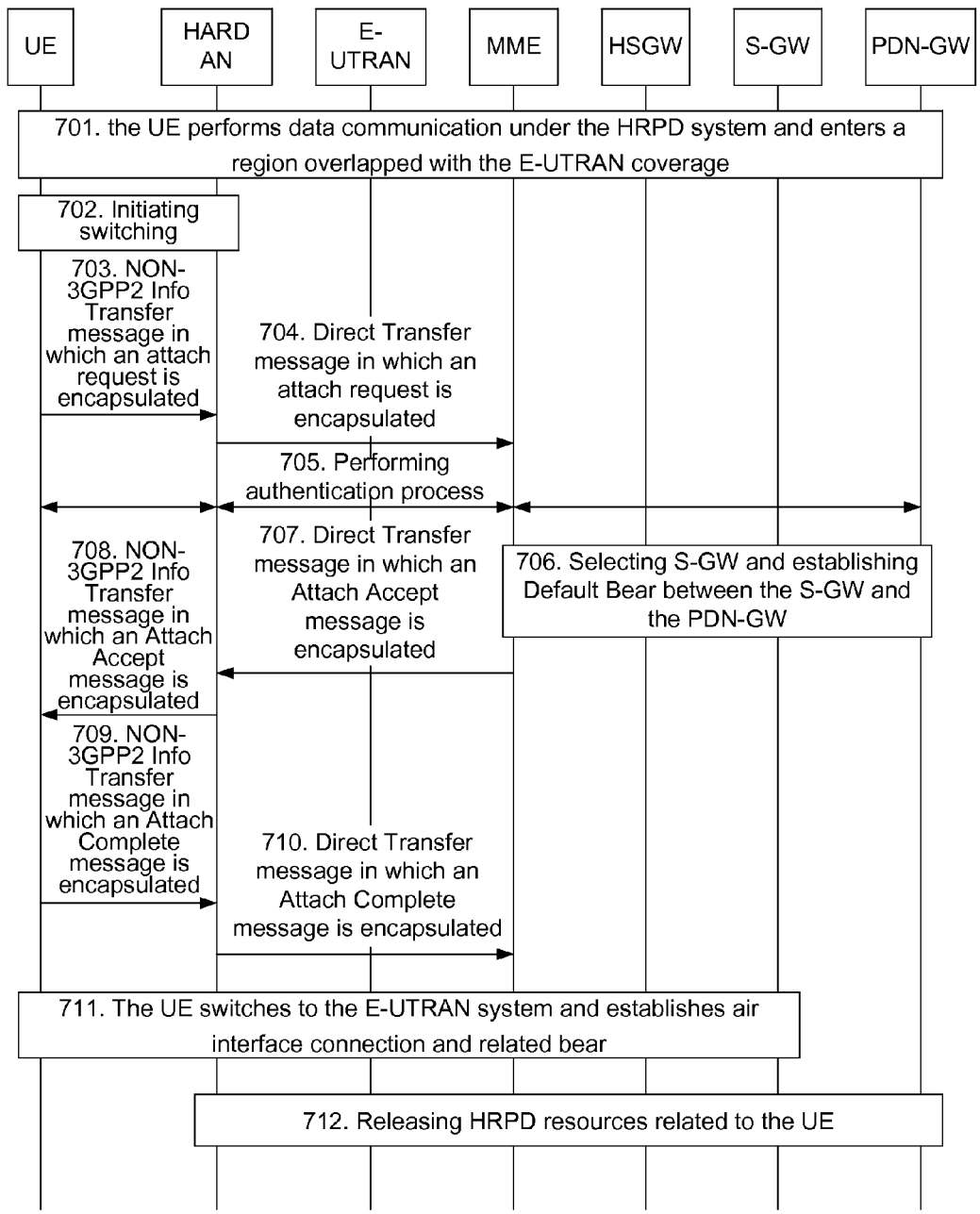
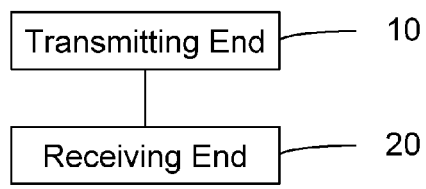

METHOD AND SYSTEM FOR TRANSMITTING NON-3GPP2 MESSAGE IN HRPD SYSTEM

TECHNICAL FIELD OF THE INVENTION

The present invention relates to a cross-system transmission technology in mobile communication, and in particular to a method and system for transmitting a non-Third Generation Partnership Project 2 (3GPP2) message in a High Rate Packet Data (HRPD) system.

BACKGROUND OF THE INVENTION

As two new generation mainstream wideband wireless communication systems, the Long Term Evolution (LTE) system formulated by 3GPP organization and Worldwide Interoperability for Microwave Access (WiMax) system formulated by WiMax Forum (WMF) and Institute of Electrical And Electronic Engineer (IEEE) have developed rapidly. An important aspect of the research is how to realize the intercommunication between new generation wideband wireless communication system and existing system (including 3GPP2 system), for example, the intercommunication between LTE system and General Packet Radio Service (GPRS) system of 3GPP, the intercommunication between LTE system and Wideband Code Division Multiple Access (WCDMA) system of 3GPP, the intercommunication between CDMA2000 and the HRPD system, etc., but simultaneously it requires minimal influence to the existing system so that the existing system is evolved or updated smoothly. The 3GPP2 system mentioned herein refers to CDMA2000 1X system and the HRPD system formulated by 3GPP2 Standard Organization. While the non-3GPP2 system refers to the system formulated by wireless standard organization other than the 3GPP2 standard organization, such as Global System For Mobile Communications (GSM) system, GPRS system, WCDMA system and the like formulated by 3GPP organization, WiMax system formulated by IEEE and WMF, Wireless Local Area Network (WLAN) system formulated by IEEE, etc.

At present, in order to realize the intercommunication between the LTE system and the HRPD system, a system architecture shown in FIG. 1 is uniformly employed after a discussion between the 3GPP and the 3GPP2. The two systems are mainly communicated through an S101 interface. Correspondingly, the HRPD needs to be enhanced properly. For example, in order to access an Evolved Packet Core (EPC) in the LTE system through the HRPD system, the original Packet Data Serving Node (PDSN) in the HRPD system is enhanced to be an HRPD Serving Gateway (HSGW) through adding the function of a Mobile Access Gateway (MAG).

Additionally, to realize optimal switching when performing switching from the LTE system to the HRPD system, before the actual switching, dual-mode User Equipment (UE) can perform pre-registration to the HRPD system through Evolved Universal Terrestrial Radio Access (E-UTRAN) system of the LTE. At this time, the message from the HRPD system is required to be capable of being transmitted transparently in a tunnel transmission mode in the E-UTRAN system. Based on hierarchical design features of HRPD air interface protocol, an HRPD message is transmitted in a normal hierarchical structure first; before further transmitted to an HRPD air radio interface for transmission, the HRPD message is required to be forwarded to the air radio interface of the E-UTRAN system for transmission. To avoid modifying physical layer of the HRPD air interface protocol, the 3GPPS adds the function of realizing the HRPD message forwarding to a connection layer of the HRPD air interface protocol, which is taken as a new sub-protocol of the connection layer, i.e., Signalling Adaptation Protocol (SAP). Some high-level sub-protocols of the HRPD air interface protocol are modified correspondingly to adapt to such a change, wherein the enhanced HRPD system is referred to as evolved HRPD (eHRPD) and the enhanced HRPD access network is referred to as evolved Access Network (eAN). On the contrary, the HRPD message, transmitted in a tunnel transmission mode through the LTE air radio interface, is obtained through the SAP, and forwarded to an HRPD processor or re-encapsulated into a message needed to be further forwarded on other interfaces (e.g., S101 interface).

FIG. 2 shows the influenced circumstance of the HRPD air interface protocol after SAP is added to the connection layer. An Inter-Radio Access Technology (Inter-RAT) prefix mark is added before an influenced sub-protocol. Four sub-protocols need corresponding modifications in total, including: initialization state protocol, idle state protocol, route update protocol and overhead message protocol. The uninfluenced sub-protocol in each layer is not shown in FIG. 2.

On the other hand, when an optimized switching is performed from the HRPD system to the LTE system, before dual-mode UE initiates switching, pre-registration to the LTE system is also needed through the HRPD system. At this time, the E-UTRAN message of the LTE system is also required to be capable of being transmitted in a transparent tunnel transmission mode in the HRPD system. As the air interface protocol of the LTE is designed separately according to an Access Stratum (AS) and a Non-Access Stratum (NAS), the E-UTRAN message of the LTE system which needs to be transmitted in tunnel transmission mode is mainly NAS signalling message. At present no effective method about how to identify, encapsulate and transmit transparently these non-3GPP2 messages in a tunnel transmission mode in the HRPD system, such as NAS Signalling message of LTE or corresponding message of WiMax and the like, has been presented.

SUMMARY OF THE INVENTION

A method and system for transmitting a non-3GPP2 message in an HRPD system are provided to realize the transmission of the non-3GPP2 message in the HRPD system.

To achieve the above purpose, the technical solutions of the present invention are realized as follows.

In one aspect, the present invention provides a method for transmitting a non-3GPP2 message in an HRPD system, comprising:

a transmitting end encapsulating the non-3GPP2 message in a non-3GPP2 Info Transfer message according to a preset format of the non-3GPP2 Info Transfer message, and transmitting the non-3GPP2 Info Transfer message to a receiving end through an HRPD air interface;

the receiving end decapsulating the non-3GPP2 Info Transfer message obtained from the HRPD air interface, according to the preset format of the non-3GPP2 Info Transfer message, to obtain the non-3GPP2 message.

The format of the non-3GPP2 Info Transfer message comprises: a message identification field, a service processing sequence number field, an acknowledgement field, a message type field, a non-3GPP2 message length field and a non-3GPP2 message field.

The method further comprising:

the receiving end constructing a non-3GPP2 Info Transfer-Ack message according to the format of the non-3GPP2 Info TransferAck message and returning the non-3GPP2 Info TransferAck message to the transmitting end, when determining according to the acknowledgement field during decapsulation that a response is needed by the transmitting end.

The format of the non-3GPP2 Info TransferAck message comprises: a message identification field, a service processing sequence number field and a reservation field.

The transmitting end is an HRPD access network, and the receiving end is user equipment (UE); the HRPD access network transmits the encapsulated non-3GPP2 Info Transfer message to the UE through a downlink of the HRPD system.

The transmitting end is a UE, and the receiving end is an HRPD access network; the UE transmits the encapsulated non-3GPP2 Info Transfer message to the HRPD access network through an uplink of the HRPD system.

The method further comprising: the HRPD access network encapsulating the non-3GPP2 message obtained through decapsulation into a message needed to be forwarded on other interfaces for further forwarding.

The format of the non-3GPP2 Info Transfer message and the format of the non-3GPP2 Info TransferAck message are generated from added non-3GPP2 message transmission application subtype and non-3GPP2 message transmission sub-protocol.

In another aspect, the present invention provides a system for transmitting a non-3GPP2 message in an HRPD system, comprising: a transmitting end and a receiving end;

the transmitting end being arranged to encapsulate the non-3GPP2 message in a non-3GPP2 Info Transfer message according to a preset format of the non-3GPP2 Info Transfer message, and transmit the non-3GPP2 Info Transfer message to a receiving end through an HRPD air interface;

the receiving end being arranged to decapsulate the non-3GPP2 Info Transfer message obtained from the HRPD air interface, according to the preset format of the non-3GPP2 Info Transfer message, to obtain the non-3GPP2 message.

The format of the non-3GPP2 Info Transfer message comprises: a message identification field, a service processing sequence number field, an acknowledgement field, a message type field, a non-3GPP2 message length field and a non-3GPP2 message field.

The receiving end is further arranged to construct a non-3GPP2 Info TransferAck message according to a format of the non-3GPP2 Info TransferAck message and return the non-3GPP2 Info TransferAck message to the transmitting end, when determining according to the acknowledgement field during decapsulation that a response is needed by the transmitting end.

The format of the non-3GPP2 Info TransferAck message comprises: a message identification field, a service processing sequence number field and a reservation field.

The format of the non-3GPP2 Info Transfer message and the format of the non-3GPP2 Info TransferAck message are generated from added non-3GPP2 message transmission application subtype and non-3GPP2 message transmission sub-protocol.

In the method and system of the present invention, the transmitting end encapsulates the non-3GPP2 message according to the preset format of the non-3GPP2 Info Transfer message and then transmits the non-3GPP2 Info Transfer message to the receiving end; the receiving end decapsulates the non-3GPP2 Info Transfer message, according to the preset format of the non-3GPP2 Info Transfer message, to obtain the non-3GPP2 message. The present invention realizes the transmission of the non-3GPP2 message in the HRPD system by only adding a non-3GPP2 message transmission application subtype and a non-3GPP2 message transmission sub-protocol to an application layer of the HRPD air interface protocol. The transmitting and receiving of the non-3GPP2 message are performed by adopting signalling application protocol of the existing HRPD air interface protocol without changing the bottom layer of the HRPD air interface protocol, which can ensure smooth evolution of a CDMA2000 HRPD system to the LTE.

BRIEF DESCRIPTION OF THE DRAWINGS

FIG. 5 shows a flowchart of the transmission of the NAS signalling message on the uplink of the HRPD system in the first embodiment of the present invention;

FIG. 6 shows a flowchart of the transmission of the NAS signalling message on the downlink of the HRPD system in the second embodiment of the present invention;

FIG. 7 shows a flowchart of UE switching from the HRPD system to the LTE system in the third embodiment of the present invention; and FIG. 8 shows a structure diagram of a system for transmitting the non-3GPP2 message in the HRPD system of the present invention.

DETAILED DESCRIPTION OF THE INVENTION

The technical solution of the present invention is further described in detail below in conjunction with the drawings and specific embodiments.

Figure 1:
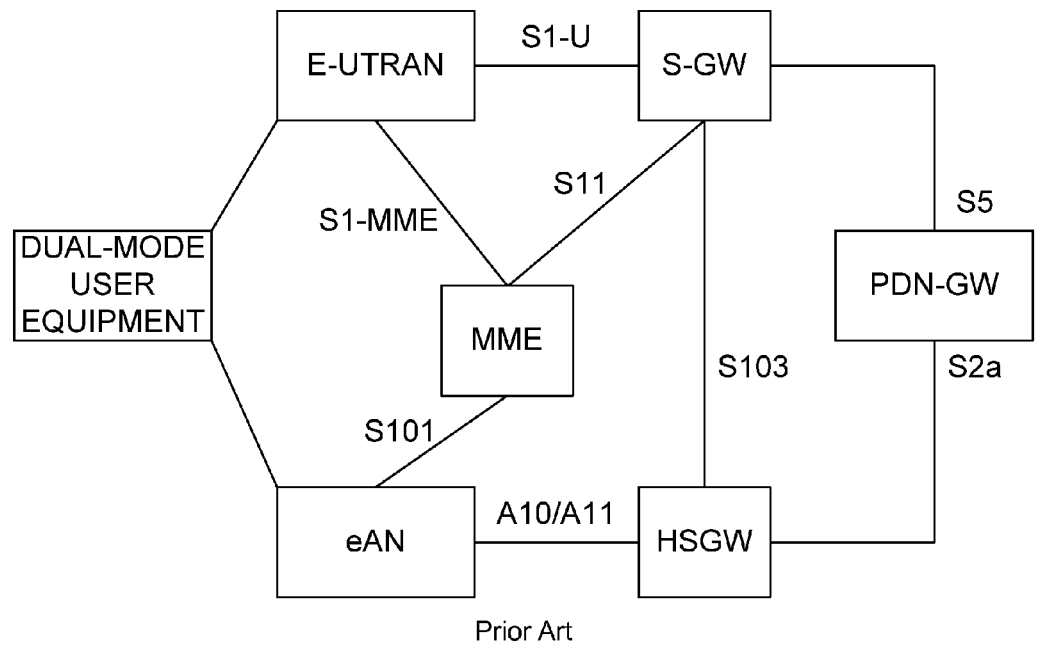
FIG. 1 shows an architecture diagram for realizing the intercommunication between the LTE system and the HRPD system in the prior art.
Figure 2:
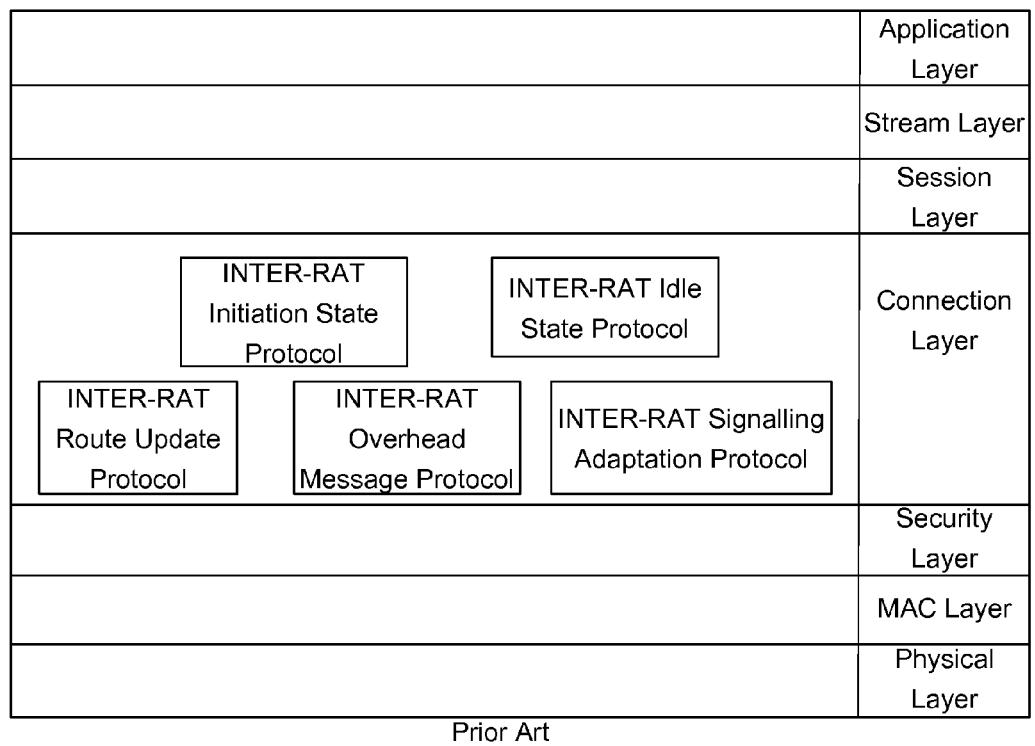
FIG. 2 shows a diagram of influenced status of the HRPD air interface protocol after SAP is added to the connection layer in the prior art.
Figure 3:
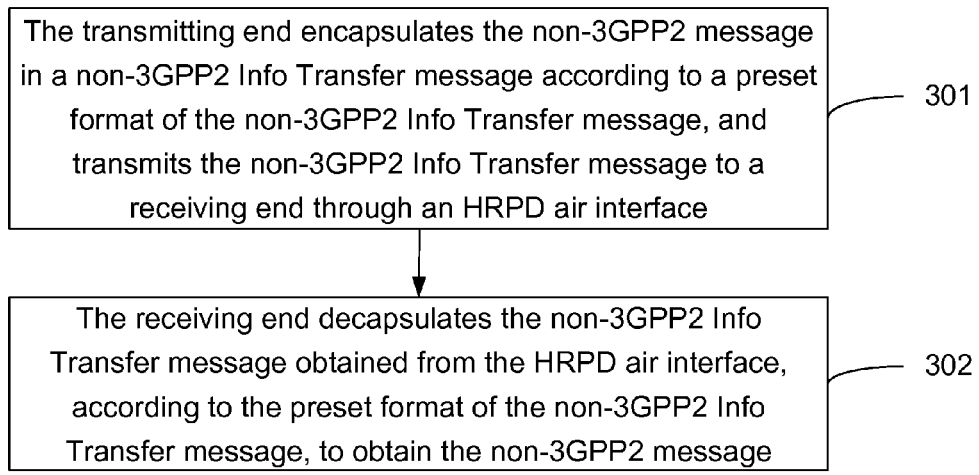
FIG. 3 shows a flowchart of a method for transmitting non-3GPP2 message in the HRPD system.

The present invention provides a method for transmitting a non-3GPP2 message in an HRPD system, as shown in FIG. 3, the method comprises the following steps:

Step 301, The transmitting end encapsulates the non-3GPP2 message in a non-3GPP2 Info Transfer message according to a preset format of the non-3GPP2 Info Transfer message, and transmits the non-3GPP2 Info Transfer message to a receiving end through an HRPD air interface.

Step 302, The receiving end decapsulates the non-3GPP2 Info Transfer message obtained from the HRPD air interface, according to the preset format of the non-3GPP2 Info Transfer message, to obtain the non-3GPP2 message.

Figure 4:
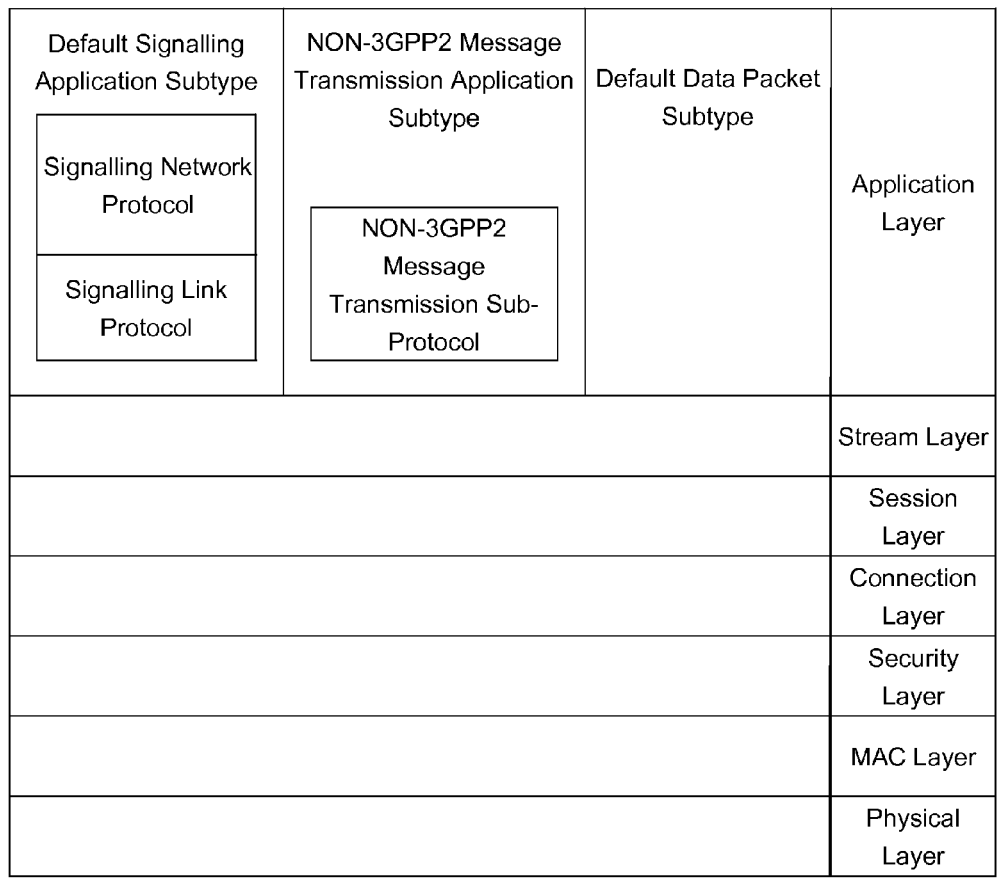
FIG. 4 is a diagram showing that a new subtype and a new sub-protocol are added to the application layer of the HRPD air interface protocol in the present invention.

The present invention adds a non-3GPP2 message transmission application subtype in the application layer of the HRPD air interface protocol. The subtype provides a 3GPP2 message transmission sub-protocol whose position in the HRPD air interface protocol is shown in FIG. 4. Through the non-3GPP2 message transmission sub-protocol, the non-3GPP2 message from the exterior can be obtained, identified and encapsulated, and then successively transmitted to the bottom layer of the HRPD air interface protocol, to perform a transparent tunnel transmission through an HRPD radio air interface. Conversely, the non-3GPP2 message in the application layer transmitted from the bottom layer of the HRPD system can also be decapsulated and transmitted to a non- 3GPP2 processor for further processing, or re-encapsulated into a message needed to be further forwarded on other interfaces (e.g., S101 interface).

The non-3GPP2 message transmission sub-protocol realizes bearing, identification and encapsulation of the above non-3GPP2 message through defining a non-3GPP2 Info Transfer message, and realizes transmission and receiving of the non-3GPP2 Info Transfer message through the signalling network protocol of the signalling application subtype of the application layer of the HRPD air interface protocol so as to realize transparent tunnel transmission of the non-3GPP2 message in the HRPD system.

The format of the non-3GPP2 Info Transfer message is defined as shown in Table 1:

TABLE 1

| Field | Length (bit) |
|---|---|
| message identification | 8 |
| service processing sequence number | 7 |
| acknowledgement | 1 |
| message type | 8 |
| non-3GPP2 message length | 16 |
| non-3GPP2 message | non-3GPP2 message length × 8 |

The message identification field is used for identifying that the transmitted message is non-3GPP2 Info Transfer message. The service processing sequence number field is used for identifying the transmission number of the non-3GPP2 Info Transfer message to avoid repeated receiving of the message or to acknowledge message receiving, and the number is increased by 1 for each another transmission and set as 1 for the first transmission. The acknowledgement field is used for informing the receiving end whether a non-3GPP2 Info TransferAck message for the non-3GPP2 Info Transfer message is needed to be returned for acknowledgement, for example, setting as 1 indicates that the receiving end needs to return a non-3GPP2 Info TransferAck message, and setting as 0 indicates no response from the receiving end is needed; or setting as 0 indicates that the receiving end needs to return the non-3GPP2 Info TransferAck message, and setting as 1 indicates no response of the receiving end is needed. The message type field, i.e., system type identification, is used for identifying that the message is a message of the LTE system or a message of the WiMax system, or a message of other systems. The non-3GPP2 message length field represents the length of the non-3GPP2 message borne by the non-3GPP2 Info Transfer message. The non-3GPP2 message field represents the non-3GPP2 message encapsulated in the non-3GPP2 Info Transfer message.

The format of the non-3GPP2 Info TransferAck message returned by the receiving end is defined as shown in Table 2:

TABLE 2

| Field | Length (bit) |
|---|---|
| message identification | 8 |
| service processing sequence number | 7 |
| reservation | 1 |

The message identification field is used for identifying that the transmitted message is a non-3GPP2 Info TransferAck message; the service processing sequence number field is used for identifying the transmission number of non-3GPP2 Info TransferAck message, of which the value is set as the value in the service processing sequence number field of the received non-3GPP2 Info Transfer message; and the reservation field has a length of 1 bit and is set as 0. The purpose of setting the reservation field is to ensure that the format of the non-3GPP2 Info TransferAck message is integral multiple of 8 bits.

The method for transmitting the non-3GPP2 message in the HRPD system is described in detail below in conjunction with the embodiment of transmission of the NAS signalling message of the LTE system in the HRPD system. Certainly, the non-3GPP2 message in the present invention is not merely limited to the NAS signalling message presented in the embodiment, but also includes related messages of the WiMax system and other non-3GPP2 systems, and the type of the message can be expanded according to the actual needs.

A flowchart of the NAS signalling message transmission on the uplink of the HRPD system in the first embodiment of the present invention is shown in FIG. 5. In this embodiment, the transmitting end is a UE, and the receiving end is an HRPD access network (AN). The method of the first embodiment mainly includes the following steps.

Step 501, When the UE under the HRPD system needs to interact signalling with a mobility management entity (MME) of the LTE system for some reason, for example, the need of pre-registration or performing switching to the LTE system, an LTE processor of the UE generates an NAS signalling message and transmits the message to a non-3GPP2 information transmission protocol processing part of the UE.

The non-3GPP2 information transmission protocol processing part of the UE encapsulates the received NAS signalling message to the non-3GPP2 Info Transfer message, in which the information type field corresponds to the LTE system type, and the message identification field corresponds to the non-3GPP2 Info Transfer message; when a receiving acknowledgement responded from the receiving end is needed, the acknowledgement field is set to be 1, then the non-3GPP2 Info Transfer message is borne through signalling application protocol message of the HRPD, and transmitted to the HRPD AN through the bottom HRPD channel (e.g., an uplink dedicated channel).

Step 502, The HRPD AN receives the signalling application protocol message bearing the non-3GPP2 Info Transfer message on the uplink HRPD channel of the UE, transmits the signalling application protocol message to a signalling application protocol processing part of the HRPD AN, parses the signalling application protocol message to obtain the non-3GPP2 Info Transfer message which is then transmitted to a non-3GPP2 message transmission protocol processing part of the HRPD AN. According to the information type field of the non-3GPP2 Info Transfer message, the non-3GPP2 message transmission protocol processing part of the HRPD AN determines that the message is an LTE system message and the message bears an NAS signalling message, then extracts the NAS signalling message; and according to the acknowledgement field of the non-3GPP2 Info Transfer message, the processing part determines that a response to the UE is needed, then returns a non-3GPP2 Info TransferAck message to the UE.

Step 503, The non-3GPP2 message transmission protocol processing part of the HRPD AN encapsulates the NAS signalling message in the Direct Transfer message transmitted on the S101 interface, and forwards the Direct Transfer message to the MME. The Direct Transfer message further contains a message S101 session ID for identifying the message related to the UE and other messages needed to be added.

A flowchart of the NAS signalling message transmission on the downlink of the HRPD system in the second embodiment of the present invention is shown in FIG. 6. In this embodiment, the transmitting end is an HRPD AN, and the receiving end is a UE. The method of the second embodiment mainly includes the following steps:

Step 601, When the UE under the HRPD system needs to interact signalling with the MME of the LTE system for some reason, for example, the need of pre-registration or performing switching to the LTE system, the MME of the LTE generates an NAS signalling message, encapsulates the NAS signalling message in a Direct Transfer message transmitted on the S101 interface and transmits Direct Transfer message to the HRPD AN. The Direct Transfer message further contains an S101 session ID for indentifying the message related to the UE.

Step 602, The non-3GPP2 message transmission protocol processing part of the HRPD AN parses the Direct Transfer message to obtain the NAS signalling message which is then encapsulated in the non-3GPP2 Info Transfer message, in which the information type field corresponds to the LTE system type, and the message identification field corresponds to the non-3GPP2 Info Transfer message; when a receiving acknowledgement responded from the receiving end is needed, the acknowledgement field is set to be 1, then the non-3GPP2 Info Transfer message is borne through a signalling application protocol message of the HRPD AN, and transmitted to the HRPD AN through the bottom HRPD channel (e.g., a downlink dedicated channel).

Step 603, The UE receives the signalling application protocol message bearing the non-3GPP2 Info Transfer message on the downlink HRPD channel of the HRPD system, transmits the signalling application protocol message to a signalling application protocol processing part of the UE; the signalling application protocol processing part parses the signalling application protocol message to obtain the non-3GPP2 Info Transfer message which is then transmitted to a non-3GPP2 message transmission protocol processing part of the UE. According to the information type field of the non-3GPP2 Info Transfer message, the non-3GPP2 message transmission protocol processing part of the UE determines that the message is an LTE system message and the message bears an NAS signalling message, then extracts the NAS signalling message and forwards the NAS signalling message to an LTE processor of the UE for processing; and according to the acknowledgement field of the non-3GPP2 Info Transfer message, the processing part determines that a response to the HRPD AN is needed, then returns a non-3GPP2 Info TransferAck message to the HRPD AN.

A flowchart of switching from the HRPD system to the LTE system in the third embodiment of the present invention as shown in FIG. 7, mainly includes the following steps:

Step 701, The UE is connected to the HRPD system currently to perform data communication, and located in a region overlapped with the E-UTRAN system coverage of the LTE.

Step 702, The UE measures the E-UTRAN system according to obtained E-UTRAN system message, determines that the condition of switching to the E-UTRAN system is met at present, then initiate switching to the E-UTRAN system.

Step 703, The UE initiates an Attach Request to the E-UTRAN system; the Attach Request message is encapsulated in a non-3GPP2 Info Transfer message which is then transmitted to the HRPD AN through an HRPD air interface. The message type field of the non-3GPP2 Info Transfer message is identified as LTE system type.

Step 704, After receiving the non-3GPP2 Info Transfer message, the HRPD AN parses the non-3GPP2 Info Transfer message to obtain the Attach Request message, encapsulates the Attach Request message in the Direct Transfer message to be transmitted on the S101 interface and transmitting the Direct Transfer message to the MME. The Direct Transfer message also contains S101 session ID for identifying message related to the UE, UE capability information, TAI information, etc.

Step 705, If the network side of the E-UTRAN system has no UE Context information, an authentication process to the UE would be initiated; a related authentication message is encapsulated and transmitted through the non-3GPP2 Info Transfer message of the HRPD air interface and the Direct Transfer message of the S101 interface. During the process, the MME obtains a packet data network gateway (PDN-GW) address from a core network.

Step 706, The MME selects serving gateway (S-GW) and establishes Default Bear between the S-GW and the PDN-GW for the UE.

Step 707, After the Default Bear is established, the MME transmits the HRPD AN an Attach Accept message which is encapsulated in a Direct Transfer message to be transmitted through the S101 interface.

Step 708, The HRPD AN forwards the Attach Accept message to the UE; the Attach Accept message is encapsulated in the non-3GPP2 Info Transfer message which is forwarded to the UE through the HRPD air interface, and the message type field identification of the non-3GPP2 Info Transfer message is identified as LTE system type.

Step 709, The UE returns an Attach Complete message to the HRPD AN; the Attach Complete message is encapsulated in the non-3GPP2 Info Transfer message which is returned to the HRPD AN through the HRPD air interface, and the message type field identification of the non-3GPP2 Info Transfer message is identified as LTE system type.

Step 710, The HRPD AN parses the non-3GPP2 Info Transfer message to obtain the Attach Complete message which is then forwarded to the MME; the Attach Complete message is encapsulated in the Direct Transfer message which is forwarded to the MME through the S101 interface.

Step 711, The UE switches to the E-UTRAN system and establishes air interface connection and related bear with the E-UTRAN system to perform communication under the E-UTRAN system.

Step 712, Each network element releases all HRPD resources related to the UE.

To perform the method for transmitting the non-3GPP2 message in the HRPD system, the present invention also provides a system for transmitting the non-3GPP2 message in the HRPD system. As shown in FIG. 8, the system comprises: a transmitting end 10, and a receiving end 20 connected with the transmitting end 10. The transmitting end 10 is arranged to encapsulate a non-3GPP2 message in a non-3GPP2 Info Transfer message according to a preset format of the non-3GPP2 Info Transfer message, and transmit the non-3GPP2 Info Transfer message to the receiving end 20 through an HRPD air interface; the receiving end 20 is arranged to decapsulate the non-3GPP2 Info Transfer message obtained from the HRPD air interface, according to the preset format of the non-3GPP2 Info Transfer message, to obtain the 3GPP2 message.

The format of the non-3GPP2 Info Transfer, as shown in the above Table 1, comprises: a message identification field, a service processing sequence number field, an acknowledgement field, a message type field, a non-3GPP2 message length field and a non-3GPP2 message field.

As a preferred embodiment of the present invention, the receiving end 20 is further arranged to construct a non-3GPP2 Info TransferAck message according to a format of the non-3GPP2 Info TransferAck message and return the non-3GPP2 Info TransferAck message to the transmitting end 10, when determining according to the acknowledgement field during decapsulation that a response is needed by the transmitting end. Correspondingly, the format of the non-3GPP2 Info TransferAck message, as shown in the above Table 2, comprises: a message identification field, a service processing sequence number field and a reservation field.

Note that, when the HRPD AN is used as the transmitting end and the UE is used as the receiving end, the HRPD access network transmits the encapsulated non-3GPP2 Info Transfer message to the UE through the downlink of the HRPD system; when the UE is used as the transmitting end and the HRPD AN is used as the receiving end, the UE transmits the encapsulated non-3GPP2 Info Transfer message to the HRPD AN through the uplink of the HRPD system.

The above is only the preferred embodiment of the present invention, and is not intended to limit the protective scope of the present invention.

The invention claimed is:

1. A method for transmitting a non-Third Generation Partnership Project 2 (non-3GPP2) message in a High Rate Packet Data (HRPD) system, comprising:
   encapsulating, by a transmitting end, a non-3GPP2 message in a non-3GPP2 Info Transfer message according to a preset format of the non-3GPP2 Info Transfer message, and transmitting the non-3GPP2 Info Transfer message to a receiving end through an HRPD air interface; and
   decapsulating, by the receiving end, the non-3GPP2 Info Transfer message obtained from the HRPD air interface, according to the preset format of the non-3GPP2 Info Transfer message, to obtain the non-3GPP2 message;
   wherein the format of the non-3GPP2 message comprises: a message identification field, a service processing sequence number field, an acknowledgement field, a message type field, a non-3GPP2 message length field and a non-3GPP2 message field.

2. The method according to claim 1, further comprising:
   constructing, by the receiving end, a non-3GPP2 Info TransferAck message according to a format of the non-3GPP2 Info TransferAck message and returning the non-3GPP2 Info TransferAck message to the transmitting end, when determining according to the acknowledgement field during decapsulation that a response is needed by the transmitting end.

3. The method according to claim 2, wherein the format of the non-3GPP2 Info TransferAck message comprises: a message identification field, a service processing sequence number field and a reservation field.

4. The method according to claim 3, wherein the format of the non-3GPP2 Info Transfer message and the format of the non-3GPP2 Info TransferAck message are generated from added non-3GPP2 message transmission application subtype and non-3GPP2 message transmission sub-protocol.

5. The method according to claim 2, wherein the format of the non-3GPP2 Info Transfer message and the format of the non-3GPP2 Info TransferAck message are generated from added non-3GPP2 message transmission application subtype and non-3GPP2 message transmission sub-protocol.

6. The method according to claim 1, wherein the transmitting end is an HRPD access network, and the receiving end is a User Equipment (UE);
   the method further comprising:
   transmitting, the HRPD access network, the encapsulated non-3GPP2 Info Transfer message to the UE through a downlink of the HRPD system.

7. The method according to claim 6 wherein the format of the non-3GPP2 Info Transfer message and the format of the non-3GPP2 Info TransferAck message are generated from added non-3GPP2 message transmission application subtype and non-3GPP2 message transmission sub-protocol.

8. The method according to claim 1, wherein the transmitting end is a UE, and the receiving end is an HRPD access network;
   the method further comprising:
   transmitting, by the UE, the encapsulated non-3GPP2 Info Transfer message to the HRPD access network through an uplink of the HRPD system.

9. The method according to claim 8, further comprising:
   encapsulating, by the HRPD access network the non-3GPP2 message obtained through decapsulation into a message needed to be forwarded on other interfaces for further forwarding.

10. The method according to claim 9, wherein the format of the non-3GPP2 Info Transfer message and the format of the non-3GPP2 Info TransferAck message are generated from added non-3GPP2 message transmission application subtype and non-3GPP2 message transmission sub-protocol.

11. The method according to claim 8, wherein the format of the non-3GPP2 Info Transfer message and the format of the non-3GPP2 Info TransferAck message are generated from added non-3GPP2 message transmission application subtype and non-3GPP2 message transmission sub-protocol.

12. The method according to claim 1, wherein the format of the non-3GPP2 Info Transfer message and the format of the non-3GPP2 Info TransferAck message are generated from added non-3GPP2 message transmission application subtype and non-3GPP2 message transmission sub-protocol.

13. A system for transmitting a non-Third Generation Partnership Project 2 (3GPP2) message in a High Rate Packet Data (HRPD) system, comprising: a transmitting end and a receiving end;
   the transmitting end being arranged to encapsulate the non-3GPP2 message in a non-3GPP2 Info Transfer message according to a preset format of the non-3GPP2 Info Transfer message, and transmit the non-3GPP2 Info Transfer message to a receiving end through an HRPD air interface;
   the receiving end being arranged to decapsulate the non-3GPP2 Info Transfer message obtained from the HRPD air interface, according to the preset format of the non-3GPP2 Info Transfer message, to obtain the non-3GPP2 message;
   wherein the format of the non-3GPP2 Info Transfer message comprises: a message identification field, a service processing sequence number field, an acknowledgement field, a message type field, a non-3GPP2 message length field and a non-3GPP2 message field.

14. The system according to claim 13, wherein the receiving end is further arranged to construct a non-3GPP2 Info TransferAck message according to a format of the non-3GPP2 Info TransferAck message and return the non-3GPP2 Info TransferAck message to the transmitting end, when determining according to the acknowledgement field during decapsulation that a response is needed by the transmitting end;
   the format of the non-3GPP2 Info TransferAck message comprises: a message identification field, a service processing sequence number field and a reservation field.

15. The system according to claim 14, wherein the format of the non-3GPP2 Info Transfer message and the format of the non-3GPP2 Info TransferAck message are generated from added non-3GPP2 message transmission application subtype and non-3GPP2 message transmission sub-protocol.

16. The system according to claim 13, wherein the format of the non-3GPP2 Info Transfer message and the format of the non-3GPP2 Info TransferAck message are generated from added non-3GPP2 message transmission application subtype and non-3GPP2 message transmission sub-protocol.

* * * * *